May 6, 1958

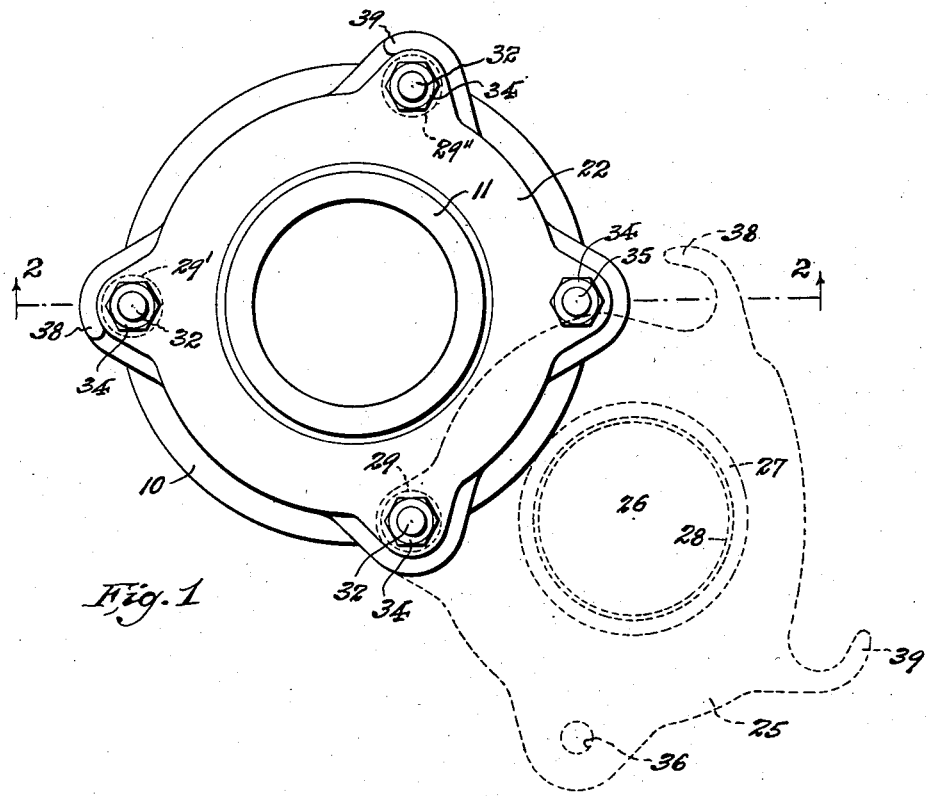
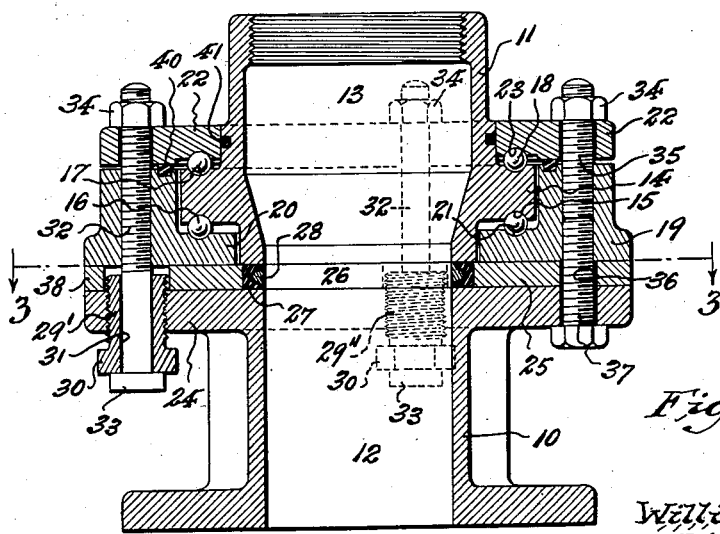

W. MEYER ET AL 2,833,566

SWING PIPE JOINT WITH GASKET HOLDER TO
PERMIT RELEASE OF GASKET FOR REPAIR

Filed July 28, 1953

INVENTORS:
William Meyer &
BY Richard Slawinski,
George A Richards
Attorney

United States Patent Office 2,833,566
Patented May 6, 1958

2,833,566

SWING PIPE JOINT, WITH GASKET HOLDER TO PERMIT RELEASE OF GASKET FOR REPAIR

William Meyer, East Orange, and Richard Slawinski, Elizabeth, N. J., assignors to Wheaton Brass Works, Union, N. J., a corporation of New Jersey Application July 28, 1953, Serial No. 370,704

3 Claims. (Cl. 285—18)

This invention relates to improvements in swing pipe joints and to sealing means therefor.

The invention has for an object to provide a novel construction of swing joint connection for pipes used to conduct fluids, the joint including widely spaced anti-friction bearings on a thrust plane to provide easy swinging action in support of suspended loads including both direct and angular loads.

The invention has for another object to provide a swing joint structure for pipe lines which includes novel means for sealing the joint against leakage, said sealing means comprising a seal ring and holder therefor, the holder and the joint structure being so related that the latter can be manipulated to release the former for outswing movement, whereby to give access to the seal ring for repair or replacement, without necessity for disassembling the joint structure or disconnecting therefrom the pipe sections joined thereby.

The above and other objects will be understood from a reading of the following detailed description of this invention in connection with the accompanying drawings showing an illustrative embodiment thereof, in which drawings:

Fig. 1 is a top end plan view of the swing pipe joint according to this invention;

Fig. 2 is a vertical longitudinal sectional view of the swing pipe joint, taken on line 2—2 in Fig. 1;

Similar characters of reference are employed in the hereinabove described views, to indicate corresponding parts.

Figure 3:
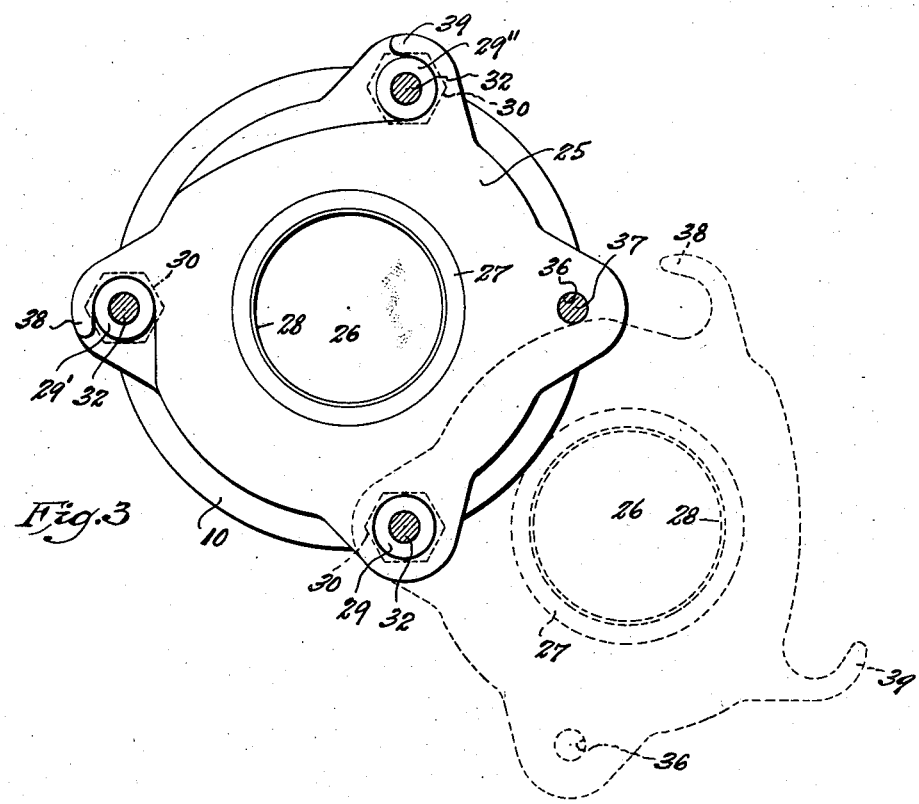
Fig. 3 is a horizontal sectional view through the swing pipe joint, taken on line 3—3 in Fig. 2.

Referring to the drawings, the reference character 10 indicates the body of the joint structure with which is aligned the swivel sleeve or member 11 to which a swingable pipe or conduit section (not shown) can be connected. Said body 10 is provided with an intake passage 12 which communicates with an output passage 13 with which the swivel sleeve or member 11 is provided.

The swivel sleeve or member 11 is supported for swiveling movement relative to the body 10 by suitable anti-friction bearing means, preferably in the form of axially spaced apart ball-bearings. In a preferred construction and arrangement of said anti-friction bearing means, the swivel sleeve or member 11 is provided, intermediate its ends, with an external annular flange 14. The bottom face of said flange 14 is provided with an annular ball race 15 for the balls 16 of a lower ball-bearing, while the top face of said flange 14 is provided with an annular ball race 17 for the balls 18 of an upper ball-bearing. Surrounding the flange 14 of the swivel sleeve member 11 is an inner ball retainer ring 19 which is provided with an internal annular flange 20 to underlie said flange 14 of the swivel sleeve or member 11. The upper face of said internal flange 20 of the inner ball retainer ring 19 is provided with an annular ball race 21 to oppose the ball race 15 of said flange 14 of the swivel sleeve or member 11, thus cooperating with the balls 16 to form the lower ball bearing of the swing joint structure. Surrounding the outer end portion of the swivel sleeve or member 11 is an outer ball retainer ring 22 which overlies both the inner ball retainer ring 19 and the flange 14 of the swivel sleeve or member 11. That part of the under face of said outer ball retainer ring 22, which overlies the flange 14 of the swivel sleeve or member 11, is provided with an annular ball race 23 to oppose the ball race 17 of the latter, thus cooperating with the balls 18 to form the upper ball bearing of the swing joint structure.

The upper or inner end of the body 10 is provided with an external flange 24 which is opposed to the swivel sleeve or member and the ball retainer rings of the ball bearings assembled therewith; and opposed between the latter assembly and said flange 24 of the body 10 is a seal ring holder plate 25, the same having a central opening 26 adapted to be aligned with and between the intake passage 12 of the body 10 and the output passage 13 of the swivel sleeve or member 11. Detachably mounted within said opening 26 of the seal ring holder plate 25, to lie between the opposed end surfaces of the body 10 and the swivel sleeve or member 11, is a seal ring 27 of resiliently compressible material. Preferably this seal ring 27 is of V-shape in cross-section, with its open side directed toward the interior thereof and toward the passage of the joint structure through which fluid is caused to flow, whereby pressure of the fluid aids in expanding the sides of the seal ring into tight sealing contact with the opposed end surfaces of the body 10 and swivel sleeve or member 11. Said seal ring 27 is provided, at its internal open side, with a keeper ring 28 which retains said seal ring against inward radial displacement.

Threaded upwardly through the flange 24 of the body 10 are a plurality of hollow jack screws 29, 29' and 29" which are disposed in circumferentially spaced apart relation, and with their upper or inner ends opposed to the underside of the inner ball retainer ring 19. Although three such jack screws are shown, it will be understood that more or less than this number can be employed. Each jack screw is provided at its outer or lower end with a head 30, preferably of polygonal shape, by which it can be turned as occasion requires. Extending upwardly through the internal axial passage 31 of each jack screw is a retainer bolt 32, the head 33 of which abuts the head 30 of the jack screw. These retainer bolts 32 are threaded through the inner ball retainer ring 19, and pass thence freely through the outer ball retainer ring 22. Threaded onto the projecting free end portions of the retainer bolts are retainer nuts 34 to engage the outer ball retainer ring 22. Spaced circumferentially intermediate adjacent jack screws 29 and 29" and their associated retainer bolts 32 is a retainer stud 35 which is threaded into the inner ball retainer ring 19, to pass thence freely through the outer ball retainer ring 22, and threaded onto the projecting free end portion of said retainer stud is a retainer nut 34 to engage said outer ball retainer ring. Extending upwardly through the flange 24 of the body 10, and thence through an opening 36 with which the seal ring holder plate 25 is provided, is a removable lock or keeper bolt 37 which screws into the inner ball retainer ring 19.

Figure 4:
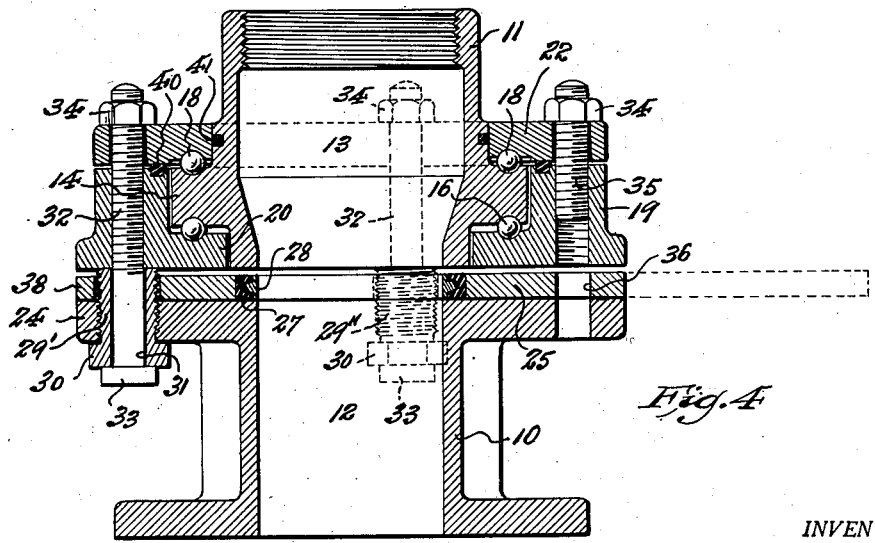
Fig. 4 is a view similar to that of Fig. 2, but showing the joint structure manipulated to release the seal ring holder for outswinging movement to give access to the seal ring for repair or replacement.

The seal ring holder plate 25 is pivotally engaged over the jack screw 29, about which it can be inwardly swung to dispose its central opening 26 in alignment with the passage of the joint structure through which fluid is caused to flow, with the seal ring operatively interposed between the opposed end surfaces of the body 10 and swivel sleeve or member 11, and about which it can be outwardly swung exteriorly of the latter parts, whereby to give access to the seal ring 27 for repair or replacement (see broken line representation of the seal ring holder plate 25 shown in Figs. 1, 3 and 4). Projecting radially from the periphery of the seal ring holder plate 25 are suitably located, laterally open, hook formations or elements 38 and 39, which are adapted to respectively engage around the respective jack screws 29' and 29", when the seal ring holder plate is in-swung to normal operative position between the body 10 and swivel sleeve or member 11 of the joint structure.

Suitable dust or grease seals 40 and 41 may be respectively interposed between the inner and outer ball retainer rings 19 and 22 and between the swivel sleeve or member 11 and the outer ball retainer ring 22.

The nuts 34 can be adjusted on the retainer bolts 32 and the retainer stud 35, so as to relate the ball retainer rings 19 and 22 to the interposed anti-friction balls 16 and 18 for desired close rolling contact, whereby to so condition the ball bearings as to assure maximum rigidity and minimum deflection of the swing joint structure under any conditions of load to which it is subjected.

When the jack screws 29, 29' and 29" are lowered relative to the flange 24 of the body 10, so as to be withdrawn from engagement with the inner ball retainer ring 19 (i. e. to positions shown in Fig. 2), the assembly of ball retainer rings and contained ball bearings with the swivel sleeve or member 11 is drawn down to tightly clamp the seal ring holder plate 25 between said assembly and the body 10, whereby to compress the seal ring 27 in sealing contact with the opposed ends of said swivel sleeve or member 11 and the body 10. Under these conditions, the seal ring holder plate 25 is secured against outswinging displacement from the described operative position thereof, by passing the removable lock or keeper bolt 37 upwardly through the flange 24 of the body 10 and the opening 36 of the seal ring holder plate 25, and thereupon screwing the same home into the inner ball retainer ring 19 (see Fig. 2).

If it is desired to obtain access to the seal ring 27 for repair or replacement thereof, the lock or keeper bolt 37 is removed, whereupon the jack screws 29, 29' and 29" are turned upwardly through the flange 24 of the body 10, to engage their upper ends against the underside of the ball retainer ring 19. After such engagement, upward turning movement of said jack screws is continued far enough to cause the same to exert upwardly lifting thrust against the assembly of ball retainer rings and contained ball bearings with the swivel sleeve or member 11, whereby to somewhat separate said assembly from the seal ring holder plate 25, thus releasing the latter from its normally clamped condition between said assembly and the body 10 (see Fig. 4).

The seal ring holder plate 25, being released in the manner above described, can thereupon be outswung to project externally from the swing joint structure, whereby to give access to the seal ring 27 for repair or replacement (see broken line showing of the seal ring holder plate in Figs. 1 and 3).

After repair or replacement of the seal ring is effected, the seal ring holder plate is swung back to normal position within the swing joint structure, whereupon the jack screws are turned downwardly or outwardly through the flange 24 of the body 10 and against the heads 33 of the retainer bolts 32, whereby to draw down the assembly of ball retainer rings and contained ball bearings with the swivel sleeve or members 11 into engagement with the seal ring holder plate, thus to again clamp the latter between said assembly and the body 10. This being done, the lock or keeper bolt 37 is returned in place to secure the seal ring holder plate against displacement. It will be noted that the above described operations do not require the parts of the swing joint structure to be dismantled or pipe sections to be disconnected therefrom.

Having now described our invention, we claim:

1. A swing joint for pipes comprising a body having a fluid passage therethrough and provided at its inner end with an external flange, a swivel member having a fluid passage therethrough for communication with said body fluid passage, an antifriction bearing structure to support said swivel member comprising an annular flange projecting externally from the swivel member, an inner set of ball-bearings cooperative with the inner side of said swivel member flange, an inner ball retainer ring for said inner set of ball bearings, an outer set of ball bearings cooperative with the outer side of said swivel member flange, and an outer ball retainer ring for said outer set of ball bearings, a seal ring holder plate displaceably insertable between the body and the swivel member and its supporting bearing structure, a seal ring carried by said holder plate for sealing interposition between the swivel member and body, a plurality of hollow jack screws threaded through the body flange in circumferentially spaced apart relation to abut said inner ball retainer ring, retainer bolts respectively extending through the respective jack screws to engage the antifriction bearing structure, said holder plate being pivotally supported by one of said jack screws for in and out lateral swinging movement intermediate the body and said swivel member and its supporting bearing structure, said holder having hook elements radially projecting from its periphery to releaseably engage the remaining jack screws, whereby to determine the in-swung operative position of said holder plate, said jack screws when out-turned through said body flange being adapted to exert draft upon said retainer bolts operative to inwardly move the swivel member and its supporting bearing structure whereby to sealingly compress the seal ring carried by the holder plate between the swivel member and body but when in-turned to separate those parts so as to release the holder plate and seal ring for out-swinging movement to give access to the seal ring, and means to releasably secure said holder plate in its in-swing operative position.

2. A swing joint for pipes according to claim 1 wherein the means to releasably secure the holder plate in in-swung operative position comprises a removable keeper bolt insertable through the body flange and holder plate into threaded engagement with the inner ball retainer ring of the swivel member supporting bearing structure.

3. A swing joint for pipes comprising a body having a fluid passage therethrough and provided at its inner end with an external flange, a swivel member having a fluid passage therethrough for communication with said body fluid passage, an anti-friction bearing structure assembled with said swivel member to support the same, a seal ring holder plate displaceably insertable between the body and the swivel member anti-friction bearing assembly and a seal ring carried by said holder plate, a plurality of hollow jack screws threaded through the body flange in circumferentially spaced apart relation to abut the swivel member anti-friction bearing assembly, retainer bolts respectively extending through the respective jack screws into engagement with the swivel member anti-friction bearing assembly, said holder plate being pivotally supported by one of said jack screws for in and out lateral swinging movement relative to the body and swivel member bearing assembly, said holder plate having hook elements radially projecting from its periphery to releasably engage the remaining jack screws, whereby to determine the in-swung operative position of said holder plate, said jack screws when out-turned through said body flange being adapted to exert draft upon said retainer bolts operative to inwardly move the swivel member anti-friction bearing assembly, whereby to sealingly compress the seal ring carried by the holder plate between the latter and the body, but when in-turned to separate swivel member anti-friction bearing assembly from said body, whereby to release the holder plate and seal ring for out-swinging movement to give access to said seal ring, and means to releasably secure said holder plate in its in-swung operative position comprising a removable keeper bolt insertable through the body flange and holder plate into threaded engagement with the swivel member anti-friction bearing assembly.

References Cited in the file of this patent

UNITED STATES PATENTS

| | | |
|---|---|---|
| 406,091 | Corliss | July 2, 1889 |
| 586,938 | Simmons | July 20, 1897 |
| 827,230 | Goeppinger | July 31, 1906 |
| 1,206,185 | Weymouth | Nov. 28, 1916 |
| 1,443,449 | Wise | Jan. 30, 1923 |
| 2,144,706 | Pescara | Jan. 24, 1939 |
| 2,225,153 | Brown | Dec. 17, 1940 |
| 2,312,341 | King | Mar. 2, 1943 |
| 2,509,090 | Faccou | May 23, 1950 |
| 2,518,443 | Bagnard | Aug. 15, 1950 |
| 2,631,063 | Jensen | Mar. 10, 1953 |
| 2,781,787 | Johnson | Feb. 19, 1957 |

FOREIGN PATENTS

| | | |
|---|---|---|
| 303,540 | Great Britain | Dec. 31, 1928 |